(12) United States Patent
Holtzman

(10) Patent No.: US 7,210,472 B2
(45) Date of Patent: May 1, 2007

(54) NITROUS OXIDE VAPOR DELIVERY SYSTEM FOR ENGINE POWER ENHANCEMENT

(76) Inventor: Barry Lyn Holtzman, 3907 Evergreen Rd., Eagle River, WI (US) 54521

( * ) Notice: Subject to any disclaimer, the term of this patent is extended or adjusted under 35 U.S.C. 154(b) by 4 days.

(21) Appl. No.: 11/126,721

(22) Filed: May 10, 2005

(65) Prior Publication Data
US 2006/0254567 A1    Nov. 16, 2006

(51) Int. Cl.
    *F02B 23/00*    (2006.01)
(52) U.S. Cl. ..................................... 123/585
(58) Field of Classification Search ........... 123/585, 123/1 A, 575; 239/570
    See application file for complete search history.

(56) References Cited

U.S. PATENT DOCUMENTS

| | | | |
|---|---|---|---|
| 4,869,132 A * | 9/1989 | Clem | 477/109 |
| 6,250,072 B1 * | 6/2001 | Jacobson et al. | 60/251 |
| 6,786,379 B2 * | 9/2004 | Largo | 227/10 |
| 6,938,841 B2 * | 9/2005 | Holtzman | 239/570 |

FOREIGN PATENT DOCUMENTS

EP    1464831 A1 * 10/2004

OTHER PUBLICATIONS

*How to Install and Use Nitrous Oxide*, p. 10 bottom pic. and desc., p. 11 2nd and 3rd left pic. and desc., p. 12 2nd para. center column, p. 16. 1st Para. Center Column, p. 22 2nd Para. 2nd Column, p. 30 4.1.1.1 Bottle Orientation, "Car Tech".
*Nitrous Express Catalog 2005*, p. 19 "Purge Value", p. 21 & 43 "Purge Valve", p. 46 "Iceman Pure.Flo", p. 61 5th Question.
*Nitrous Oxide Systems 2005 Catalog*, p. 7 Center Column Line 41, p. 15 Top of 3rd Column, p. 28 1st Para. Lines 5 2nd Para. Line 7, p. 55 "Purge Kits".

* cited by examiner

*Primary Examiner*—Stephen K. Cronin
*Assistant Examiner*—Hyder Ali

(57) ABSTRACT

This invention is a nitrous oxide delivery system to improve engine power in which the nitrous oxide leaves its storage bottle as a vapor rather than conventional liquid delivery systems in which it leaves as a liquid. This system can therefore use a relatively simple pressure regulator and fixed orifice to maintain an essentially constant nitrous oxide mass flow rate over a wide range of storage bottle pressure. The nitrous oxide which enters the engine does not contain any ice crystals and will not cause icing, therefore allowing introduction of the nitrous virtually anywhere in the engine's induction tract.

5 Claims, 1 Drawing Sheet

NITROUS OXIDE VAPOR DELIVERY SYSTEM FOR ENGINE POWER ENHANCEMENT

Figure 1:
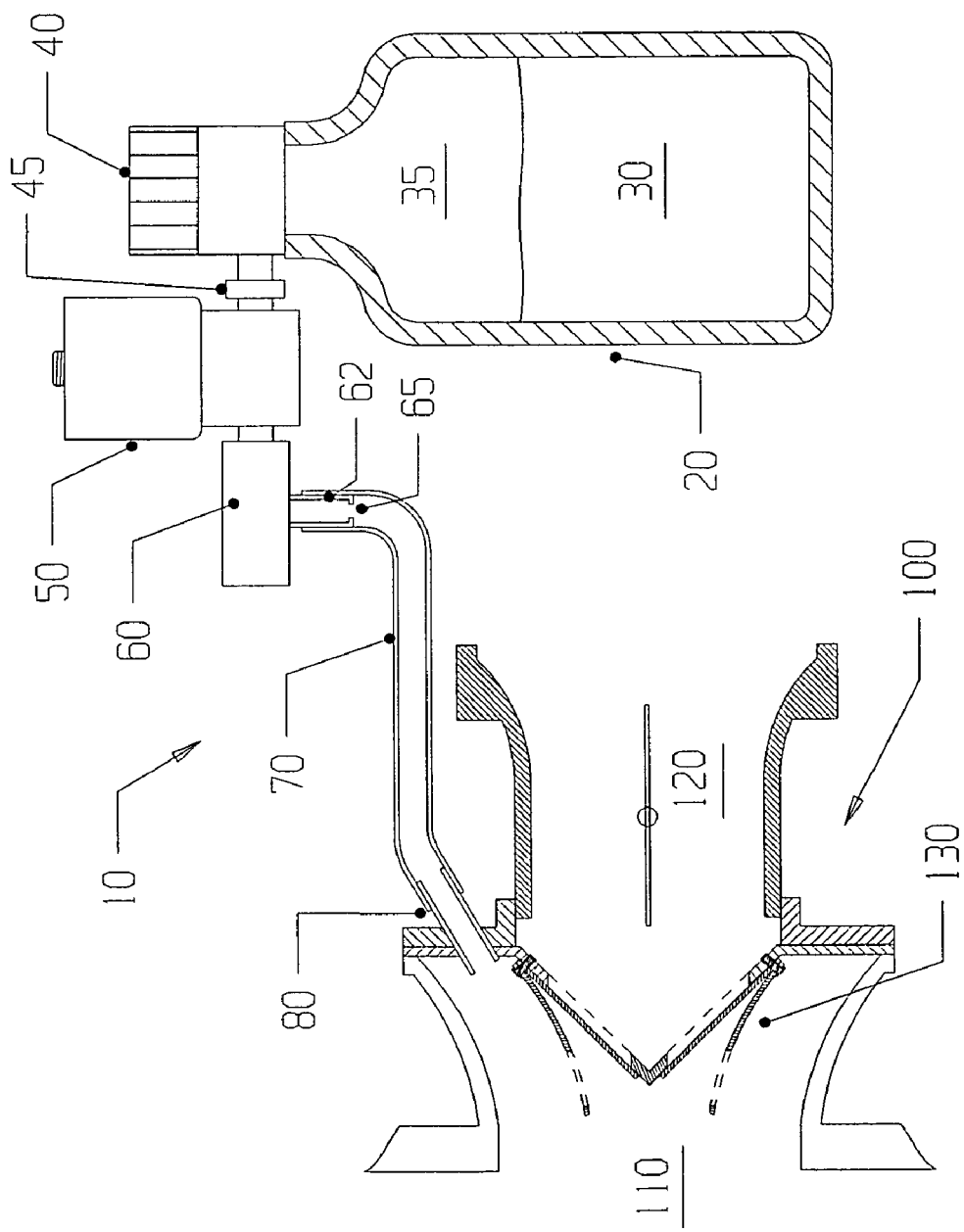

This invention is a nitrous oxide delivery system used for engine power enhancement in which the nitrous oxide leaves the storage bottle as a gas or vapor instead of a liquid as in conventional systems. This vapor system can effectively use a relatively simple pressure regulator to control nitrous flow, allows the nitrous to be injected in virtually any location, and provides a system which is lower in cost and easier to install than conventional liquid delivery systems.

BACKGROUND-DESCRIPTION OF PRIOR ART

Nitrous oxide, sometimes just called nitrous, is an oxidizing agent, and if delivered to an engine, can result in an increase in engine power output. It is stored in a container under pressure as a liquid in equilibrium with its vapor, thereby allowing a relatively high mass storage density. Since the vapor pressure of nitrous oxide increases with increasing temperature, the bottle pressure increases with temperature. For instance, at 0 degrees Celsius, the bottle pressure is 31E06 dynes/cm$^2$ (450 pounds per square inch (PSI)); when at 25 degrees Celsius, the bottle pressure is 55E06 dynes/cm$^2$ (815 PSI).

Nitrous oxide is commonly used as an oxidizer for engine power enhancement and as an anesthetic. When nitrous oxide is used as an anesthetic, vapor delivery systems are used wherein the nitrous oxide leaves its storage bottle as a gas or vapor. This is accomplished by placing the bottle in an upright position (assuming it does not have an internal siphon tube that connects the bottle's valve to an area near the bottle's bottom), and since the liquid is denser than the vapor and is in the lower portion of the bottle, only vapor leaves the bottle. Since the vapor is in equilibrium with its liquid, some liquid boils in the bottle to replace the lost vapor mass. A pressure regulator and orifice is commonly used to regulate the flow rate of the nitrous oxide vapor to the patient.

When nitrous oxide is used as an oxidizer for engine power enhancement, liquid delivery systems are used wherein the nitrous oxide leaves the bottle as a liquid. This is achieved by placing the bottle in an inverted position (valve down) if the bottle does not contain a siphon tube, or in a more upright position if the bottle contains a siphon tube. Liquid nitrous oxide leaves the bottle through its valve, then typically goes through a solenoid operated activation valve, through appropriate delivery lines, and finally to a nozzle which delivers the nitrous to the engine. This nozzle contains a jet or orifice which controls mass flow rate. At the entrance to the nitrous jet, the pressure is essentially the same (only slightly less) than the bottle pressure, but as it passes through the jet, its pressure decreases to typically essentially atmospheric pressure, it vaporizes, and its temperature decreases significantly. At atmospheric pressure, liquid nitrous oxide has a boiling point of −88 degrees Celsius, and this is essentially the temperature at which the nitrous oxide vapor exits the nitrous jet.

This low nozzle exit temperature of the nitrous oxide vapor is a principal reason liquid delivery systems are used for engine power enhancement (and one reason liquid systems are not used in anesthetic applications); the cold nitrous vapor is dense with a correspondingly high oxygen mass density. This can be understood by comparing the oxygen density of nitrous oxide gas at atmospheric pressure and −88 degrees Celsius (185 Kelvin degrees) to air at atmospheric pressure and a typical engine inlet temperature of 20 degrees Celsius (293 Kelvin degrees). Air is approximately 23% oxygen by weight; nitrous oxide approximately 36%. The average molecular weight of air is approximately 29; nitrous oxide is approximately 44. The oxygen density is directly related linearly to the molecular weight and the percent oxygen and inversely related linearly to the absolute temperature. The oxygen density of nitrous oxide relative to the oxygen density of air at the above conditions is therefore $(0.36/0.23)*(44/29)*(293/185)=3.8$. This means that if the crankcase of a two-stroke cycle engine contains a mixture of air at 20 degrees Celsius and nitrous oxide at its atmospheric pressure boiling point of −88 degrees Celsius, and if the proper fuel is supplied to both components, the nitrous oxide portion of the mix will have an energy density 3.8 times the energy density in the portion which is air.

A similar analysis can be made for nitrous oxide which is delivered as a vapor. In this case, the energy density is not amplified by the extremely cold nozzle exit temperature which exists in the liquid system. The nitrous oxide vapor cools slightly as it goes from the high pressure in the bottle to atmospheric pressure, but this temperature difference is relatively small and will be ignored for this discussion. Assuming the air and nitrous oxide are at the same temperature, the relative oxygen density of nitrous oxide to that of air is represented by $(0.36/0.23)*(44/29)=2.4$.

Therefore, this analysis shows that a liquid nitrous oxide system used for engine power enhancement will have an inherent advantage over a vapor system due to the potentially higher oxygen and energy densities attainable with the liquid system. Therefore, nitrous oxide delivery systems used as engine oxidizers have been liquid systems.

The above analysis assumes an ideal environment, but the real world is different. Things can occur which actually lessen the seemingly insurmountable advantage of a liquid delivery system over a vapor system in most applications. First, although the nitrous oxide vapor delivered by a liquid system initially has a temperature of −88 degrees Celsius as it leaves the nitrous nozzle, this extremely cold temperature is not maintained if the nitrous oxide vapor must travel through the engine's induction tract. Its temperature will increase due to the extremely large temperature difference between the cold vapor and warmer engine components. Another problem with liquid nitrous oxide systems is the fact that the nitrous oxide actually leaves the nozzle as a mixture of vapor and ice crystals. These ice crystals are abrasive and can cause engine damage. Also, if the vaporizing nitrous oxide is sprayed where it relatively quickly contacts a solid surface, such as the interior of an engine or its induction tract, there is a deposit of nitrous oxide ice. This ice deposit prevents the total immediate use of the nitrous oxide as an oxidizer, therefore lessening its effect on engine power, and the ice can break off and go through the engine and cause damage. If sprayed on or near reeds commonly used as induction valves for two-stroke-cycle engines, reed breakage is common due to the extremely cold temperature of the spray. Another problem with liquid nitrous oxide systems is the fact that the relatively high pressure existing in the bottle is essentially maintained until the nitrous oxide exits the nozzle, requiring high pressure lines to be used for the entire delivery system. Also, if a liquid nitrous oxide system is used for small horsepower engines which require a relatively small mass delivery rate of nitrous, the jet which controls the nitrous oxide flow becomes very small. For liquid systems required to deliver a low flow rate of nitrous, Inventor has had to use nitrous oxide jets as small as 0.15 mm (0.006 inches) in diameter, these extremely small orifice sizes being expensive and difficult to manufacture.

Also, in liquid delivery systems, the components of the system downstream of the bottle, such as the activation valve and delivery lines, are commonly warmer than the liquid in the bottle due to their location relatively close to the engine and exhaust. Boiling of liquid nitrous will occur in these components to cool them, resulting in a mixture of liquid and vapor. This causes less than rated nitrous delivery through the nitrous jet due to the lower density of the mixture relative to a "pure" liquid, and contributes to an undesirable effect called nitrous delay. Purge valves, valves which vent nitrous to the atmosphere, are used to remove this nitrous vapor to insure relatively "pure" nitrous liquid exists in the system at the start of actual system use.

OBJECTS AND ADVANTAGES

It is an object of this invention to provide a nitrous oxide vapor delivery system for engine power enhancement wherein the nitrous oxide leaves the storage bottle as a vapor.

It is a further object of this invention to provide said nitrous oxide vapor delivery system which uses a pressure regulator in combination with an orifice to control mass flow rate of nitrous oxide.

It is a further object of this invention to provide said nitrous oxide vapor delivery system wherein the nitrous oxide exits the system as a gas absent any ice crystals or ability to cause icing on a surface against which it is sprayed.

It is a further object of this invention to provide said nitrous oxide vapor delivery system for a relatively small mass flow rate of nitrous oxide wherein the size of the orifice which controls the mass flow rate is larger than an orifice size of a nitrous oxide liquid delivery system of the same flow rate.

Still further objects and advantages will become apparent from a consideration of the ensuing description and drawings.

DRAWING FIGURES

FIG. 1 shows in partial cross-section a nitrous oxide vapor delivery system and part of an engine, the nitrous oxide being delivered to the engine for power enhancement.

REFERENCE NUMERALS IN DRAWINGS 10 nitrous oxide vapor delivery system
20 nitrous oxide storage bottle
30 liquid nitrous oxide
35 nitrous oxide vapor
40 bottle valve
45 high pressure nitrous conduit
50 system activation valve
60 pressure regulator
62 pressure regulator outlet fitting
65 nitrous oxide jet
70 low pressure nitrous conduit
80 engine nitrous fitting
100 partial engine assembly
110 engine crankcase
120 engine throttle body
130 engine induction reed valve

DESCRIPTION AND OPERATION—FIG. 1

FIG. 1 shows a preferred embodiment of a nitrous oxide vapor delivery system 10 having a storage bottle 20 containing liquid nitrous oxide 30 in its bottom section and nitrous oxide vapor 35 in its upper portion. A bottle valve 40 is normally kept closed but opened when filling bottle 20 or when system 10 will be used. A high pressure conduit 45 connects bottle valve 40 to a system activation valve 50 which is usually solenoid operated. In this preferred embodiment, a pressure regulator 60 is used to provide a relatively constant regulated pressure which is applied to outlet fitting 62 which contains a nitrous jet 65 for controlling nitrous oxide mass flow rate. Regulator 60 and jet 65 therefore provide a relatively constant nitrous oxide vapor flow rate regardless of bottle 20 pressure. A low pressure conduit 70 connects fitting 62 to a fitting 80 used to deliver the nitrous oxide to an engine assembly, shown here in part as partial engine assembly 100. Engine assembly 100 in this case is shown as a two-stroke-cycle type, containing a crankcase 110, a throttle body 120, and an induction reed valve 130. Engine assembly 100 is shown as having only one throttle body 120, induction reed valve 130, and crankcase 110 and nitrous oxide system 10 is only shown as having one fitting 62 with jet 65, low pressure conduit 70, and engine fitting 80, but it is to be understood that a system 10 used on an engine with multiple cylinders may contain multiple components 62, 65, 70, and 80.

Bottle 20 is shown in an upright (valve upward) position and is shown as lacking an internal siphon tube, sometimes called a dip tube, an internal conduit which connects valve 40 to a region near the bottom of bottle 20. Since nitrous oxide liquid 30 is in the bottom of bottle 20 and vapor 35 is in the upper portion, nitrous oxide vapor 35 will be delivered to valve 40 and therefore to the rest of system 10. Hence system 10 is called a vapor delivery system. If bottle 20 does contain an internal siphon tube (not shown), then if used in vapor system 10, bottle 20 would be inverted to deliver nitrous vapor 35. Vapor 35 passes through bottle valve 40 and high pressure conduit 45 upon operation of activation valve 50, thereby pressurizing regulator 60. In a preferred embodiment, regulator 60 is set to maintain an internal regulated pressure of 8.3E06 dynes/cm^2 (120 PSI) and regulator 60 is able to maintain this regulated pressure over a wide range of bottle 20 internal pressure. Jet 65 is sized to provide the desired nitrous oxide flow rate at the regulated pressure. Nitrous oxide therefore passes through jet 65 whereupon its pressure decreases, entering low pressure conduit 70 at a pressure depending on the flow characteristics of conduit 70 and engine fitting 80, but a preferred pressure is about 1.4E06 dynes/cm^2 (20PSI) or less. This low pressure allows conduit 70 to be easily connected to fittings 62 and 80 using barbs on these fittings. Nitrous oxide finally passes through engine fitting 80 for injection into engine assembly 100 to increase engine power.

The nitrous oxide which passes through engine fitting 80 does not go through a phase change from liquid to a vapor (gas) as it would in a liquid system. A liquid system contains essentially exclusively nitrous oxide liquid up to the last nitrous jet, the nitrous changing to a vapor as it passes through the jet because of the large pressure drop to normally atmospheric pressure. This phase change results in a nitrous vapor temperature of −88 degrees Celsius; ice crystals and icing on surfaces near the spray can exist. In the vapor system 10 of this invention, as nitrous vapor leaves bottle 20, nitrous liquid boils inside the bottle to replace the lost vapor. Since the phase change occurs in bottle 20 which is relatively large with a relatively large thermal mass, the nitrous oxide that exits fitting 80 is cool, but not extremely cold such as in a liquid system, and therefore no icing occurs and there are no ice crystals in the spray. Therefore, fitting 80 can essentially be placed anywhere to supply nitrous oxide to an engine, such as in the crankcase or near the reeds or transfer ports of two-stroke-cycle engine 100 or near an intake valve of a four-stroke-cycle engine.

A "supercharging" effect can occur if fitting 80 is located "downstream" of induction reed valve 130 of engine 100 as shown in FIG. 1. In a two-stroke-cycle engine, the reeds of valve 130 are typically open only about 120 degrees of crankshaft rotation, meaning induction reed valve 130 is closed two-thirds of the time. During this time when the reeds are closed, if fitting 80 is still injecting nitrous vapor downstream of reed valve 130, the pressure in crankcase 110 rises to a higher value than normal, hence the term "supercharging". If all gas molecules in crankcase 110 are at the same temperature, this means that at whatever pressure the crankcase attains at valve 130 closing, the number of molecules is fixed. In this case, this is a mixture of air and nitrous, giving a total mass of trapped oxygen which is higher than the case of totally atmospheric air due to the higher percentage of oxygen in the nitrous and higher molecular weight of nitrous compared to atmospheric air. But then in addition, since fitting 80 continues to deliver nitrous to crankcase 110 even after valve 130 has closed, the total mass of crarkcase oxygen is further increased over that which would occur if the nitrous had to pass through valve 130. This "supercharging" effect further improves engine performance over that which would occur if the nitrous was injected "upstream" of valve 130. This is made possible because more oxygen is present in the crankcase, and if more fuel is added, the resulting cylinder explosion will provide a higher cylinder pressure. This "supercharging" effect is perilous, however, in the case of liquid systems due to the possibility of icing and consequent engine damage.

This "supercharging" effect reduces the inherent oxygen density disadvantage the vapor system has relative to a liquid system. Testing has shown that in some cases, this "supercharging" effect can actually make the oxygen density of a vapor system superior to a liquid system. A 2005 model year Polaris Fusion snowmobile having a 900 cubic centimeter two-stroke-cycle engine with two cylinders and reed valve induction was tested with a liquid nitrous system. This system delivered 10 grams/second nitrous oxide using technology described in Inventor's pending application Ser. No. 10/458,989. In this case, the nitrous was injected in an induction plenum "upstream" of the throttle bodies and reeds and divided approximately equally between each throttle body. The exhaust on this engine is fairly close to this intake plenum and throttle bodies, causing them to be relatively warm. The nitrous vapor delivered by this liquid system is extremely cold, and in passing through these relatively warm components results in appreciable warming of the nitrous vapor. This nitrous warming diminishes the effect of the nitrous oxide on the engine's oxygen density. The engine gained 200–250 revolutions per minute (RPM) upon application of nitrous from this liquid system over the RPM which was attained without nitrous.

The same engine and snowmobile was then fitted with a vapor system similar to system 10 of this invention except this system had two outlets 62 from regulator 60. Regulator 60 was set at about 8.6E06 dynes/cm^2 (125 PSI) and two jets 65 having a diameter of 1.4 mm delivered approximately 5 grams/second of nitrous "downstream" of each induction reed valve 130 (a total of 10 grams/second as in the liquid test above). Low pressure conduits 70 were polyurethane tubing and connected to fittings 62 and 80 with simple low pressure hose barbs. Using this vapor delivery system the engine RPM increase was 300.

These tests indicate that this vapor system similar to system 10 was at least as effective in improving engine power as a conventional liquid system of the same nitrous flow rate, this in spite of the fact that the oxygen density of the nitrous vapor leaving fitting 80 in the vapor system is less than the oxygen density of the nitrous leaving the nitrous jet in the liquid system. Other advantages in this case were less cost to manufacture and easier installation.

Applicant provides nitrous systems for small displacement engines in which the desired nitrous flow rate is about 1 g/sec through a fixed nitrous jet. Using a conventional liquid system, the orifice size of the nitrous jet is about 0.20 mm (0.008 inches) depending on the bottle temperature. This jet is difficult and expensive to manufacture due to its small orifice size. Using a vapor system, the orifice size increases to about 0.34 mm (0.013 inches) which is a much easier orifice size to manufacture.

SUMMARY, RAMIFICATION, AND SCOPE

Accordingly, the reader will see that this invention is a nitrous oxide delivery system for engine power enhancement in which the nitrous oxide leaves its storage bottle in the vapor state and is a vapor in the rest of the system. This allows use of a pressure regulator in combination with one or more nitrous jets to control nitrous oxide mass delivery rate, and therefore can be designed to provide essentially constant nitrous delivery over normal bottle operating pressures. This system is ideal for introduction directly into the crankcase of a two-stroke-cycle engine and in some cases can actually improve engine power over a conventional liquid nitrous system. This vapor system offers other advantages such as lower manufacturing cost, easier installation, and an absence of engine damage from ice crystals and icing common in liquid systems.

Although the description above contains many specificities, these should not be construed as limiting the scope of the invention but as merely providing illustrations of some of the presently preferred embodiments of this invention. For instance, the system described uses a pressure regulator and orifice to control the mass flow rate of nitrous oxide, but a variable orifice such as that described in Applicant's pending application Ser. No. 10/458,989 can be used. Also, a simple fixed orifice can be used to control mass flow rate. Thus, the scope of the invention should be determined by the appended claims and their legal equivalents, rather than by the examples given.

I claim:

1. A system which delivers nitrous oxide to an engine as an oxidizing agent comprising a nitrous oxide storage container which contains a first portion of said nitrous oxide which is a liquid and a second portion of said nitrous oxide which is a vapor, said vapor having a first pressure when at a first temperature and a higher second pressure when at a higher second temperature, a pressure regulation means to establish a first regulated pressure when said vapor has said first pressure and a second regulated pressure when said vapor has said second pressure, and a conduit to deliver said nitrous oxide from said storage container, said conduit having an entrance inside said storage container wherein, in normal operation of said system, said entrance of said conduit is located in said second portion of said nitrous oxide which is a vapor whereby said storage container delivers essentially only said second portion of said nitrous oxide which is a vapor.

2. The system of claim 1 wherein said first regulated pressure is essentially equal to said second regulated pressure.

3. The system of claim 1 wherein said first regulated pressure is applied to an orifice.

4. The system of claim 1, wherein said storage container includes a valve body and said entrance is located in said valve body, and wherein, in normal operation of said system, said entrance is elevated relative to said first portion of said nitrous oxide which is a liquid.

5. The system of claim 1, wherein said storage container includes a valve body, and wherein a first end of a siphon tube is installed in said valve body and said entrance is located at a second end of said siphon tube, and wherein, in normal operation of said system, said entrance is elevated relative to said first portion of said nitrous oxide which is a liquid.

* * * * *